United States Patent Office 3,223,474
Registered Dec. 14, 1965

3,223,474
METHOD OF HYDROLYZING SILICON CHLORIDES
Siegfried Nitzsche and Paul Buchheit, Burghausen, Bavaria, Germany, assignors to Wacker-Chemie G.m.b.H., Bavaria, Germany
No Drawing. Filed Mar. 7, 1962, Ser. No. 177,992
Claims priority, application Germany, Mar. 15, 1961, W 29,655
4 Claims. (Cl. 23—14)

This invention relates to a novel method for hydrolyzing chlorine bonded to silicon and particularly chlorosilanes.

The hydrolysis of chlorine on silicon as in chlorosilanes, chlorosiloxanes and so forth, is a relatively simple chemical reaction following the generalized reaction $$\equiv SiCl + HOH \rightarrow \equiv SiOH + HCl$$

However, the hydrolysis step may be followed by more or less spontaneous condensation of the silicon-bonded hydroxyl groups according to the generalized reaction $$\equiv SiOH + HOSi \equiv \rightarrow H_2O + \equiv SiOSi \equiv$$

and this condensation may be undesirable. The HCl by-produced during the hydrolysis will often cleave silicon-bonded acid-sensitive groups such as phenyl radicals. Furthermore, the by-produced HCl may have an undesired effect on organo-functional radicals bonded to silicon atoms such as the saponification of nitrile radicals bonded to silicon through alkylene radicals, hydroxyl groups esterified by carboxylic acids or carboxyl groups esterified by alcohols.

To avoid the noted difficulties, hydrolysis of chlorosilicon compounds and polymers has been carried out in the presence of sodium bicarbonate, sodium acetate, zinc oxide, calcium hydroxide and other inorganic, acid binding compounds. However, because of the alkaline nature of such materials they cannot be used in the presence of hydrogenosilicon compounds and polymers because they attack the H—Si bond. This alkali attack releases hydrogen and, where alkali earth oxides or heavy metal oxides or hydroxides are employed as the acid binders, difficultly soluble silanolates will precipitate.

It is the primary object of this invention to introduce a novel method for hydrolyzing chlorine bonded to silicon. A hydrolysis method useful with phenylchlorosilicon compounds is also sought. Another object is a method of hydrolyzing chlorohydrogenosilicon compounds and polymers without liberation of hydrogen bonded to silicon. A further object is a method of hydrolyzing chlorosilicon compounds and polymers without undue condensation of the resulting hydroxyl groups on silicon. Other objects and advantages accruing from this invention are detailed in or will be apparent from the disclosure and claims following.

This invention comprises the hydroylsis of cholorsilicon compounds and polymers employing a mixture of water and ethylene oxide such that the molar quantity of water and of ethylene oxide is at least equivalent to the gram-atoms of silicon-bonded chlorine in the material to be hydrolyzed.

According to the method of the present discovery all silicon chlorides, that is compounds which contain Si-bonded chlorine can be hydrolyzed individually or as mixtures. The silicon chlorides include particularly silanes of the general formula $R_xH_ySiCl_{4-(x+y)}$. In this formula each R is a monovalent hydrocarbon radical or a monovalent substituted hydrocarbon radical, $x$ is 0, 1, 2 or 3, $y$ is 0, 1, 2 or 3 and the sum of $x+y$ is 1, 2 or 3.

The silicon chlorides also include chlorodi- and chloropolysilanes, i.e., silanes wherein the silicon atoms are bonded by Si—Si bonds and contain halogen atoms and R radicals and/or hydrogen atoms as substituents on one or more silicon atoms. Furthemore, the silicon chlorides include the chlorosilcarbanes, i.e., silanes in which the silicon atoms are bonded, in addition to halogen atoms and R radicals and/or hydrogen atoms by an Si–R'–Si bond, to one or more silicon atoms which again carry halogen atoms and/or R radicals and/or H atoms each, R' is a divalent hydrocarbon radical, such as the methylene, ethylene and phenylene radicals. Finally, as a further example of silicon chlorides, siloxanes containing Si—Cl bonds in addition to R radicals and/or oxygen atoms are included.

Examples of monovalent hydrocarbon radicals are: alkyl radicals such as methyl, ethyl, isopropyl, tert.-butyl, 2-ethylhexyl, dodecyl, octadecyl, and myricyl, alkenyl radicals such as vinyl, allyl, decenyl and hexadienyl, cycloalkyl radicals such as cyclohexyl and cyclopentyl, cycloalkenyl radicals such as cyclopentenyl, cyclohexenyl and cyclo-2,4-hexadienyl, aryl radicals such as phenyl, napthyl and xenyl, aralkyl radicals such as benzyl, phenylethyl and xylyl and alkaryl radicals such as tolyl and dimethylphenyl.

Examples of substituted hydrocarbon radicals are: halogenated hydrocarbon radicals such as chloromethyl, 3,3,3-trifluoropropyl, 3,3,4,4,5,5,5-heptafluoropentyl-, perchlorophenyl-, 3,4-dibromocyclohexyl-, alpha,beta,beta-trifluoro-alpha - chlorocyclobutyl-, alpha,alpha,alpha-trifluorotolyl, 2,4-dibromobenzyldifluoromonochlorovinyl-, and 2-iodocyclopentene-3-yl radicals and cyanoalkyl radicals such as beta-cyanoethyl-, gamma-cyanopropyl-, omega-cyanobutyl-, beta-cyanopropyl-, gamma-cyanobutyl- or omega-cyanooctadecyl radicals, cyanoalkoxyalkyl radicals such as beta-cyanoethyloxypropyl radicals, hydroxyalkyl radicals esterified with carboxylic acids, such as propionyloxymethyl or acetoxyethyl radicals and carboxylalkyl radicals esterified with alcohols such as radicals of the formula $CH_3OOCCH_2$—$CH_2$ and $$CH_3OOCCHCH_3—CH_2—$$

Individual examples of silicon chlorides are: trichlorohydrogenosilane, monomethyltrichlorosilane, dimethyldichlorosilane, trimethylchlorosilane, methylhydrogendichlorosilane, phenylmethylhydrogenchlorosilane, phenylmethyldichlorosilane, diphenyldichlorosilane, chloromethyltrichlorosilane, gamma - cyanopropylmethyldichlorosilane, beta - cyanoethyloxypropylmethyldichlorosilane, as well as fractions boiling beneath 55° and above 70° C. at normal pressures, occurring as by-products of the direct process synthesis of methylchlorosilanes (i.e., the reaction of $CH_3Cl$ with silicon) (see, e.g., U.S. Patents Nos. 2,721,855 and 2,706,723 describing such by-products) which contain chlorosilanes containing Si bonded hydrogen as well as chlorodi- and polysilanes, chlorosilcarbanes and chlorosiloxanes.

The quantity of water which is used in the process of the present discovery is that which is commonly employed for the hydrolysis of silicon chlorides to siloxanes, i.e., at least that molar quantity of water is used which is equivalent to the quantity of gram-atoms of Cl in the compounds to be hydrolyzed. An excess of 1–25 mols of water per gram-atom of hydrolyzable Cl, for example, is not generally deleterious, but in hydrolyzing silicon halides which contain other hydrolysis sensitive bonds, particularly Si—H bonds, it is expedient to exceed the minimum quantity necessary for the hydrolysis of the Cl atoms in the silanes as little as possible. Preferably water of the lowest possible temperature is used, such as ice water, i.e., water at 0° C.

It is expedient to use a small excess of ethylene oxide over the molar quantity which is equivalent to the quantity of chlorine gram-atoms in the silicon chlorides to be hydrolyzed. Preferably this excess is from 0.01 to 50 percent by weight of the theoretically necessary quantity; an excess over this does not hurt, but carries no material advantages. The ethylene oxide is mixed with the hydrolysis water before the hydrolysis.

It is advantageous to use organic solvents which are fluid at normal temperature and pressure with the method of the present discovery. The solvents to be used are those which are ordinarily used in the hydrolysis of silicon chlorides. As examples of such solvents one may name: solvents which are immiscible or only slightly miscible with water such as hydrocarbons, e.g., hexanes, heptanes, octanes, benzene, toluene, xylene; halogenated hydrocarbons such as methylene chloride and trichloroethylene; ethers such as di-n- and di-iso-butylether, diethylether and carboxylic acid esters such as acetic acid ethyl ester.

If hydrolyzates with an exceptionally high content of silicon-bonded hydroxyl groups are desired or if it is desired to get by with the minimum quantity of water theoretically required for the hydrolysis when hydrolyzing especially sensitive siloxanes, it is particularly advantageous to use organic common solvents for silicon chloride, ethylene oxide and water such as tetrahydrofuran, dioxane or acetone. The weight ratio of solvent to water may be between 0.1:1 and 100:1.

Another preferred step in increasing the content of silicon-bonded hydroxyl groups in the siloxanes consists of carrying out the process of the present discovery in two stages: in a first stage the hydrolysis is carried out with only 50–90 mol percent, preferably 60–70 mol percent, of the water theoretically necessary for hydrolyzing all of the silicon-bonded chlorine and the remainder of the chlorine is hydrolyzed with an excess of water only in a second stage.

The method of the present discovery is preferably carried out at normal pressure and at temperatures between −80° and +30° C. To complete the hydrolysis it is sometimes preferable (especially when the quantity of water is somewhere in the realm of the theoretical) to heat until reflux after the reaction components have been united to complete the reaction.

Oils, resins and elastomers may be prepared in the known manner from the hydrolyzates obtained by the method of this discovery. They may also be used to advantage as additives in processing other siloxane polymers. For example, the hydrolyzates with a high hydroxyl group content obtained according to the method of the present discovery are suitable as plasticizers, i.e., as materials for reducing the rigidity resulting from storage and to reduce the milling time of materials which are hardenable to elastomers based on diorganopolysiloxanes with a viscosity of at least 100,000 cs. at 25° C. and active fillers such as silica with a particle diameter up to 25 m$\mu$ and a specific surface of at least 50 m²/g.

The hydrolyzates of the present discovery containing silicon-bonded hydrogen, mixed with other organopolysiloxanes if desired, are particularly suited as hydrophobizing materials for surfaces of all kinds such as textiles and masonry and for use in the ordinary fields and forms of application for polysiloxanes containing silicon-bonded hydrogen. So, for example, the hydrolyzates and cohydrolyzates of dihydrogendichlorosilane prepared according to the present discovery are suitable because of their solubility in organic solvents such as benzine and because of their strong reducing action as reducing agents. These hydrolyzates can be used, for instance, in combination with titanium halides for polymerizing ethylene.

The following examples are included to aid those skilled in the art in understanding and practicing this invention. The scope of the invention is delineated in the claims and is not limited by the examples. All parts and percentages in the examples are based on weight unless otherwise stated and all temperatures are expressed in degrees centigrade.

*Example 1*

350 g. of phenylmethyldichlorosilane were poured into a mixture of 2,000 ml. ice water and 200 g. ethylene oxide over a period of 60 minutes while stirring rapidly. A siloxane with a density greater than one was formed and deposited at the bottom of the reaction vessel. The siloxane was dissolved with 300 ml. of ether and freed of by-produced ethylene chlorohydrin by repeated washing with water. After evaporating the ether, 260 grams of a waxlike, soft, colorless product were obtained with an Si—OH group content of 9.8 percent.

The phenylmethyldichlorosilane was hydrolyzed under the same conditions without the concurrent use of ethylene oxide and oily polysiloxanes were obtained containing fewer than 1.2 percent OH groups.

*Example 2*

350 g. of gamma-cyanopropyl-methyl-dichlorosilane were poured into a mixture of 2,000 ml. of ice water and 180 g. ethylene oxide over a period of 60 minutes while stirring rapidly. The resulting hydrolyzate, which was more dense than water, was dissolved with ether and freed from ethylene chlorohydrin by washing with water and from ether by distillation. A colorless, heavy fluid oil was obtained containing 10.9 percent (theor. 11.02 percent) nitrogen.

The gamma-cyanopropyl-methyl-dichlorosilane was hydrolyzed under the same conditions without ethylene oxide and nitrogen losses of up to 50 percent of the theoretical were observed in the hydrolyzate.

*Example 3*

Employing the method of Example 2 with a mixture of 2,000 ml. ice water and 190 g. ethylene oxide, there were obtained 242 g. of a hydrolyzate with 1.6 percent Si—OH groups and 8.0 percent N from 350 g. of beta-cyanoethyloxypropylmethyldichlorosilane of the formula

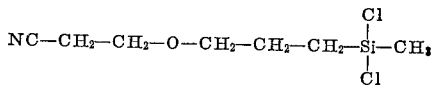

without observing any loss in nitrogen in the hydrolyzate.

*Example 4*

To a mixture of 500 g. (2.75 mol) gamma-cyanopropyl-methyldichlorosilane and 500 g. diethylether which had been placed in a stirring apparatus, a mixture of 170 g. ethylene oxide, 500 g. tetrahydrofuran and 33.0 g. of water were added drop wise over a period of 60 minutes at 10°–15°. After stirring for 2 hours, during which the temperature rose spontaneously to 30°, the ether and tetrahydrofuran solvents as well as the ethylene chlorohydrin which had been formed were removed by distillation.

The distillation residue was then run off into a separatory funnel and was slowly added to a mixture of 3,000 ml. ice water and 100 g. ethylene oxide while the temperature is first kept under 20°, later under 30°.

Two clear phases are formed. The organic phase is freed of ethylene chlorohydrin by washing with water.

The product obtained, briefly dried with sodium sulfate, was 330 g. of a relatively thin flowing oil containing: nil chlorine, 10.55 percent N, 8.23 percent OH and 21.12 percent Si. These analytical findings correspond to the formula:

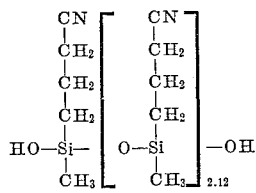

This oil was extraordinarily suitable as a plasticizer and milling aid in preparing elastomers based on diorganopolysiloxanes containing cyanoalkyl groups.

*Example 5*

500 g. beta-cyanoethyltrichlorosilane were poured into a mixture of 355 g. ethylene oxide and water at 15°. 110 g. of a viscous resin were obtained containing 4.39 percent OH, 12.06 percent N, 24.2 percent Si and 3.06 percent Cl. These analytical findings correspond to units of the fomula:

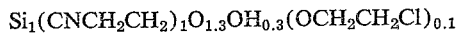

The viscous consistency of this resin and its solubility in organic solvents make possible its further use for co-condensation with other polysiloxanols.

Beta-cyanoethyltrichlorosilane was hydrolyzed under the same conditions without also using ethylene oxide and the product was a solid, colorless, powdery substance which was not solvent-soluble.

*Example 6*

A mixture of 135 g. trichlorohydrogensilane and 173 g. methylhydrogendichlorosilane was hydrolyzed employing a mixture of 2,000 ml. ice water, 300 ml. acetic acid ethyl ester and 264 g. ethylene oxide. There was obtained 138 g. of a soft, tacky resin which dissolved completely in methylene chloride and trichloroethylene after removal of the solvent.

A mixture of the $HSiCl_3$ and $CH_3SiHCl_2$ was hydrolyzed with ice water in the presence of acetic ester and absence of ethylene oxide and produced a solvent-insoluble gel with considerable losses of the silicon-bonded hydrogen.

*Example 7*

300 g. of a dimethylpolysiloxane displaying dimethylchlorosiloxy end groups with 25.3 percent chlorine were poured into a mixture of 500 g. ice water and 145 g. ethylene oxide over a period of 60 minutes.

208 g. of a colorless oil were obtained containing 3.95 percent silicon-bonded hydroxyl groups.

The same chlorine-containing polydimethylsiloxane, upon hydrolysis under the same conditions but in the absence of ethylene oxide, yielded an oil with fewer than 0.5 percent Si-bonded hydroxyl groups.

*Example 8*

200 g. $H_2SiCl_2$ (2 mols) were conducted into a mixture of 400 g. tetrahydrofuran, 36 g. (2 mols) water and 200 g. ethylene oxide, which had been cooled to —40° to —30°, while stirring rapidly. The cooling bath was removed and the reaction mixture was allowed to warm to room temperature. The mixture was then heated for 20 minutes at reflux to accelerate the hydrolysis and condensation to siloxanes. There appears an insignificant evolution of hydrogen during reflux. Thereafter 600 g. of benzine with a B.P. of 150°–180° were added and the components of the mixture boiling under 150° were distilled off at 20°/12 mm. Hg. The residue remaining was washed a number of times, each time with 100 ml. of water, to remove residues of the water-soluble solvent.

In the removed clear benzine phase, 643 g. of product were found containing 0.38 percent by weight of hydrogen. This corresponds to 60 weight percent of the silicon-bonded hydrogen in the silane incorporated.

*Example 9*

A mixture of 230 g. methylhydrogendichlorosilane and 100 g. dihydrogendichlorosilane cooled to —30° was added in small portions to a mixture of 600 g. tetrahydrofuran, 270 g. ethylene oxide and 54 g. water cooled to —40° to —30° while stirring rapidly. Further treatment of the homogeneous mixture was carried out as described in Example 8.

238 g. benzine solution of a siloxane were obtained containing 1.37 percent by weight of Si—H hydrogen. This corresponds to 65 percent by weight of the silicon-bonded hydrogen in the silanes incorporated.

*Example 10*

150 g. $H_2SiCl_2$ and 200 g. ethylhydrogendichlorosilane were cohydrolyzed at —30° to +10° with a mixture of 400 g. tetrahydrofuran, 300 g. ethylene oxide and 54.8 g. water as in the process described in Example 8, and processed further. 370 g. benzine solution of a cohydrolyzate were obtained containing 1.14 percent by weight Si—H hydrogen. This corresponds to 89 percent by weight of the silicon-bonded hydrogen in the silanes incorporated.

An attempt was made to hydrolyze dichlorosilane and mixtures of dichlorosilane with methyl- and ethyldichlorosilane under the same conditions, i.e., the conditions of Example 8, without using ethylene oxide, however, there will result, under a very lively evolution of hydrogen, solvent-insoluble gels.

That which is claimed is:

1. In the method of hydrolyzing chlorine atoms bonded directly to silicon atoms in at least one chlorosilicon material selected from the group consisting of chlorosilanes, chloropolysilanes, chlorosilcarbanes, and chlorosiloxanes, the remaining valences of the silicon atoms in said chlorosilicon material being substituents selected from the group consisting of hydrogen atoms, monovalent hydrocarbon radicals, cyanoalkyl radicals, monovalent halogenated hydrocarbon radicals, cyanoalkoxyalkyl radicals, hydroxyalkyl radicals esterfied with carboxylic acids, and carboxyalkyl radicals esterified with alcohols, the improvement consisting of employing at least a molar equivalent of water and at least a molar equivalent of ethylene oxide for each gram-atom of chlorine bonded to silicon in the reaction mass.

2. The method consisting essentially of reacting a chlorosilicon material selected from the group consisting of chlorosilanes, chloropolysilanes, chlorosilcarbanes, and chlorosiloxanes, the remaining valences of the silicon atoms in said chlorosilicon material being substituents selected from the group consisting of hydrogen atoms, monovalent hydrocarbon radicals, cyanoalkyl radicals, monovalent halogenated hydrocarbon radicals, cyanoalkoxyalkyl radicals, hydroxyalkyl radicals esterified with carboxylic acids, and carboxyalkyl radicals esterified with alcohols, with water in the presence of ethylene oxide, there being present at least a molar equivalent of water and a molar equivalent of ethylene oxide for each gram-atom of chlorine bonded to silicon in the chlorosilicon composition.

3. The method of hydrolyzing a chlorosilane of the general formula $R_xH_ySiCl_{4-(x+y)}$ wherein each R is a monovalent organic radical selected from the group consisting of hydrocarbon radicals, halogenated hydrocarbon radicals, cyanoalkyl radicals, cyanoalkoxyalkyl radicals, hydroxyalkyl radicals esterified with carboxylic acids and carboxyalkoxy radicals esterified with alcohols, $x$ has a value from 0 to 3 inclusive, $y$ has a value from 0 to 3 inclusive and the sum of $x+y$ has a value from 1 to 3 inclusive consisting essentially of reacting said silane with a mixture of water and ethylene oxide, the water and ethylene oxide being present in quantities such that there is present at least a molar equivalent of water and of ethylene oxide for each gram-atom of chlorine present in the chlorosilane.

4. The method of claim 3 wherein the reaction is carried out in the presence of an organic solvent selected from the group consisting of hydrocarbons, halogenohydrocarbons, ethers and carboxylic acid esters.

References Cited by the Examiner

UNITED STATES PATENTS

| 2,529,956 | 11/1950 | Myles et al. | 260—448.8 |
| 2,590,812 | 3/1952 | Barry | 260—448.2 |
| 2,901,460 | 8/1959 | Boldebuck | 260—448.2 |

OTHER REFERENCES

Takiguchi, "Jour. Am. Chem. Soc.," vol. 81, May 1959, pages 2359–61.

MAURICE A. BRINDISI, *Primary Examiner.*

TOBIAS LEVOW, *Examiner.*